United States Patent [19]

Collins

[11] Patent Number: 4,688,346
[45] Date of Patent: Aug. 25, 1987

[54] BUTT STRUCTURE WITH ADJUSTABLE REEL SEAT

[76] Inventor: Stuart Collins, 526 NE. 190 St., No. Miami Beach, Fla. 33179

[21] Appl. No.: 889,514

[22] Filed: Jul. 25, 1986

Related U.S. Application Data

[63] Continuation-in-part of Ser. No. 848,769, Apr. 7, 1986, Pat. No. 4,637,157.

[51] Int. Cl.⁴ ............................................. A01K 87/06
[52] U.S. Cl. ........................................... 43/22; 43/23
[58] Field of Search .................... 43/22, 23, 18.1, 18.5

[56] References Cited

U.S. PATENT DOCUMENTS

| | | | |
|---|---|---|---|
| 2,088,132 | 7/1937 | Domecq | 43/23 |
| 2,104,495 | 1/1938 | O'Brien | 43/22 |
| 2,885,816 | 5/1959 | Cunningham | 43/22 |
| 3,073,055 | 1/1963 | Edwards | 43/23 |
| 4,045,902 | 9/1977 | Ohmura | 43/22 |
| 4,077,150 | 3/1978 | Barnes | 43/23 |
| 4,083,141 | 4/1978 | Shedd | 43/23 |

*Primary Examiner*—Gene P. Crosby
*Attorney, Agent, or Firm*—John Cyril Malloy

[57] ABSTRACT

A butt structure of the type used in combination with fishing rods and substantially large fishing reels used for heavy duty deep sea sport fishing and the like which is specifically designed and adapted for both removable and adjustable connection and support of a reel seat tube. The reel seat tube is structured for removable support of a fishing reel and secure fixed engagement to a fishing rod such that when the entire assembly is stored, the fishing reel remains secured to the fishing rod thereby allowing for the rigging attached to both the reel and the rod to remain in place while the butt structure may be removed or specifically positioned in an out-of-the-way orientation.

12 Claims, 11 Drawing Figures

BUTT STRUCTURE WITH ADJUSTABLE REEL SEAT

BACKGROUND OF THE INVENTION

This is a continuation-in-part application of presently pending patent application Ser. No. 848,769 filed April 7, 1986, now U.S. Pat. No. 4,637,157.

FIELD OF THE INVENTION

This invention relates to fishing equipment particularly of the type used in sport fishing or "deep sea" fishing wherein a butt structure is used to support a reel and a fishing rod so that the entire assembly can be contained in the socket of a "fighting chair" or on a "fighting belt" secured to the fisherman and used to support a trolling type fishing rod. The structure of the butt assembly is such as to allow its removal or selective adjustable orientation from the mounting of a reel seat which in turn is fixedly secured to a fishing rod.

DESCRIPTION OF THE PRIOR ART

Fishing rods primarily designed for use in deep sea trolling or surf fishing conventionally include an elongated rod blank defining on end of the rod. This rod end or blank is intended to be fitted within what is commonly referred to as a butt structure. Accordingly, one end of the butt is specifically configured to be received within a socket permanently but movably mounted on a "fighting chair" or alternately on a "fighting belt" secured to the fisherman.

In prior art fishing equipment of the type referred to herein, a fishing reel is of course used in combination with a fishing rod and is normally secured directly to the butt structure rather than the fishing rod itself. Accordingly, when the fishing rod is stored, after use, the fishing reel is separated from the fishing rod and maintained for storage in connection with the butt structure. This of course necessitates complete dismantling of the rigging including the fishing line, leaders, hooks, etc., from the fishing rod since, as set forth above, the fishing rod is normally removed from the reel and the reel and the rod are stored separately.

Alternately, in prior art butt structures, it is quite common to have a curved structure rather than a straight line configuration. Accordingly, when storing the fishing rod, reel assembly and butt structure, in an assembled form, without dismatling thereof, the curved butt structure is frequently difficult to position so as to not interfere with head room or the like.

Butt structures of the type referred to herein are of the general type disclosed in U.S. Pat. No. 4,083,141 to Shedd disclosing an integral butt and reel seat for an offshore trolling rod made by swaging a unitary tubular member to form a rearwardly tapering butt section, a transition section tapering forwardly from a forward end of the butt section to a decreased diameter and a cylindrical reel seat section that extends forwardly from the transition section and as a forward end thereof threaded for reception of an adjustable threaded reel hood. Accordingly, as seen in the Shedd patent, the reel seat which is specifically structured to mount a reel thereon is fixedly or integrally secured to the remainder of the butt structure such that when the entire assembly is stored, the reel and butt structure are detachable from the fishing rod necessitating the dismantling and disconnecting of the remaining rigging.

There is a need in the sport fishing industry for a butt construction specifically designed to have a reel seat removably mounted thereon and/or adjustably mounted thereon such that, during storage, the reel seat may be fixedly secured to the fishing rod so as to allow storage therewith and eliminate the necessity of removing or dismantling any of he rigging used in fishing. Also, if it is desired to store the butt structure in combination with the attached and combined reel seat and fishing rod, provision should be made in a preferred structure, to adjust a curved butt structure into an out-of-the-way position or location to eliminate interference with headway or the like.

SUMMARY OF THE INVENTION

This invention relates to a butt structure of the type utilized in combination with a reel assembly and fishing rod normally associated with deep sea sports fishing conducted from a trolling boat or alternately of the type capable of being mounted on a fighting belt secured directly to the fisherman. The butt structure has a slotted gimble secured to a distal end thereof and defining an extremity of the butt structure. The gimble structure is specifically designed to fit within a socket of a fighting chair or fighting belt, as set forth above. The opposite or proximal end of the butt structure includes a mounting means in the form of an elongated rod or tubular element projecting outwardly from the associated end of the butt structure and fixedly secured thereto. The present invention further includes a reel seat tube specifically structured on the exterior surface thereof to support a reel through the means of a reel hood engaging opposite ends of the base. Threaded portions serve to movably support a locking nut and other structures substantailly conventionally known in the fishing industry for the removable securement of a reel base in fixed position on a reel seat.

An important feature of the present invention however is the existence of a reel seat tube which is disposed to fit in surrounding, concentric and supported relation on the mounting means projecting outwardly from the butt structure as set forth above.

The reel seat tube is of sufficient length such that the mounting means only extends along a portion of the interior of the reel seat tube. The opposite end from that associated with the mounting mean is structured to include an open end for the receipt and permanent attachment of the fishing rod blank therein.

Accordingly, an important feature of the present invention is the fixed attachment of the reel seat to the fishing rod. This eliminates the necessity of dismantling or cutting off all rigging such as leaders, fishing lines, hooks, etc. when it is desired to store the rod and reel assembly after fishing.

Another important feature of the present invention is the provision of a stop means mounted in part on the reel seat tube and also on the mounting means.

More specifically, the stop means comprises a substantially elongated stop element formed on the interior of the reel seat tube in approximately intermediate position between the opposite open ends thereof. The stop element is disposed in diametrically transverse relation to the length of the reel seat tube and secured thereto at the opposite ends of the stop element. In addition, the stop means further comprises at least one, but preferably two elongated grooves formed in one exposed end of the mounting means and arranged in transverse relation to one another and dimensioned and configured to receive the stop element therein when the mounting means is placed within the reel seat tube. Mating engagement between one of the respective grooves and the stop element serves to restrict rotational movement of the mounting means relative to the tube element. However, the mounting means may be selectively positioned at successive 90 degree orientations relative to its original position by removal of the stop element from a first groove and placement of the stop element in the second of the two grooves. Accordingly, it should be readily apparent that the mounting means, especially when it is attached to a curved or angled butt structure may be oriented in a 90 degrees out-of-the-way location for storage of the entire fishing rod, reel assembly and butt structure if so desired.

Another important feature of the present invention is the existence of a longitudinal dimension of the reel seat tube being sufficient to provide a space immediately adjacent the leading end or extremity thereof. This space is disposed and dimensioned to receive a reel brace of the type used with conventional reel structures on the market, such as a Penn International or Senator big game reel. The placement of the reel brace in supported engagement with the brace space eliminates the possibility of the reel brace marring or damaging a fore grip or handle on the fishing rod blank.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
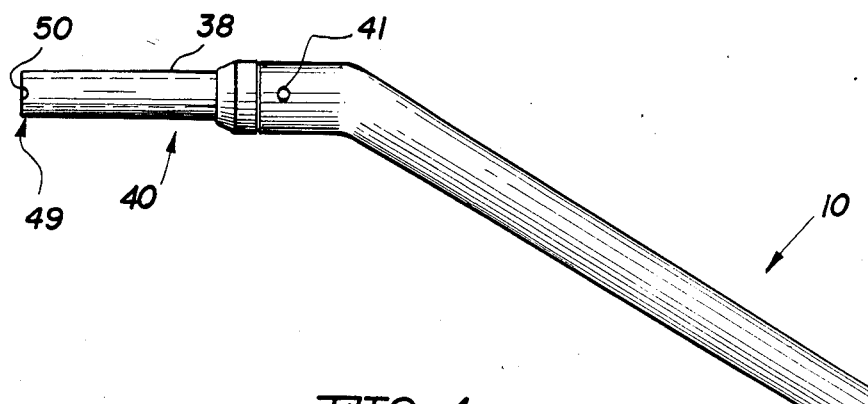
FIG. 1 is a side elevational view of a butt structure of the present invention which has a conventional angle rather than straight line configuration.
Figure 2:
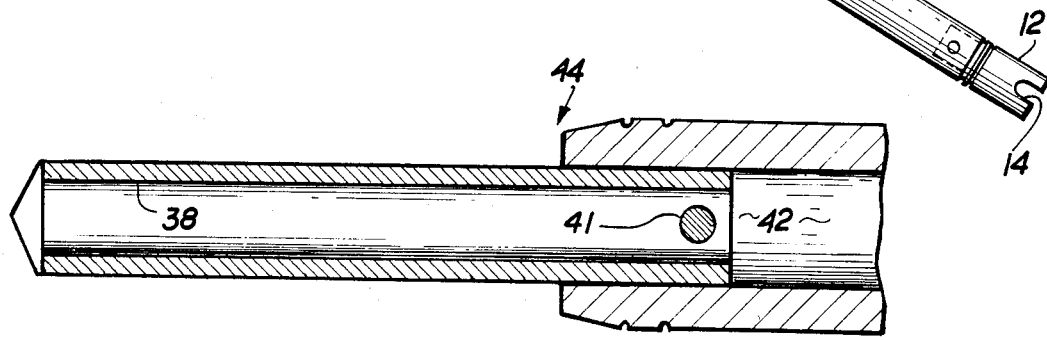
FIG. 2 is one embodiment of the present invention to be described in greater detail hereinafter.
Figure 3:
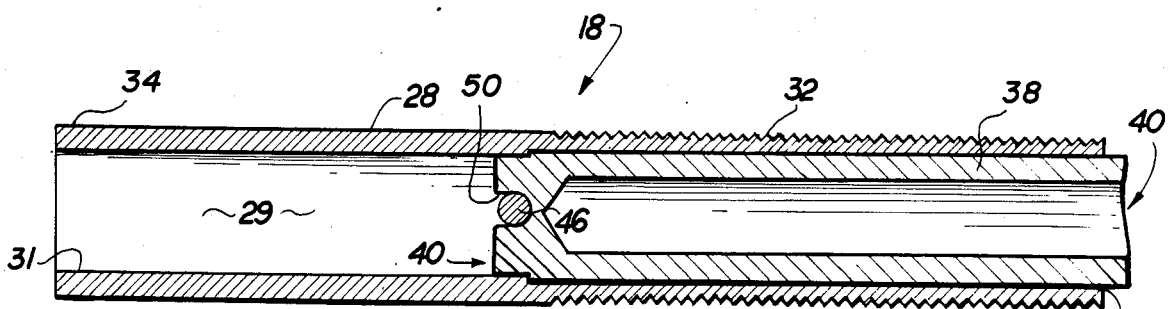
FIG. 3 is a longitudinal sectional view in partial cutaway showing details of the stop structure of the present invention.
Figure 4:
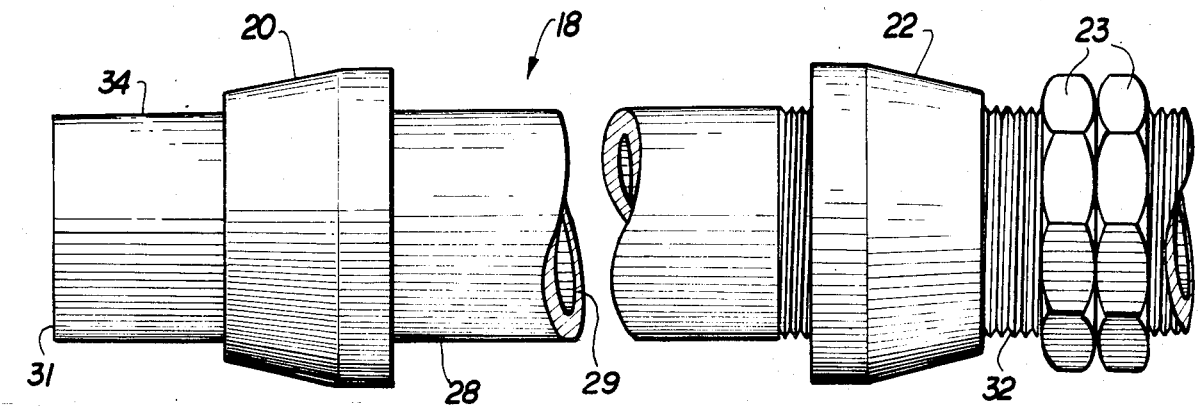
FIG. 4 is a side view in partial cutaway of the reel seat tube of the present invention.
Figure 5:
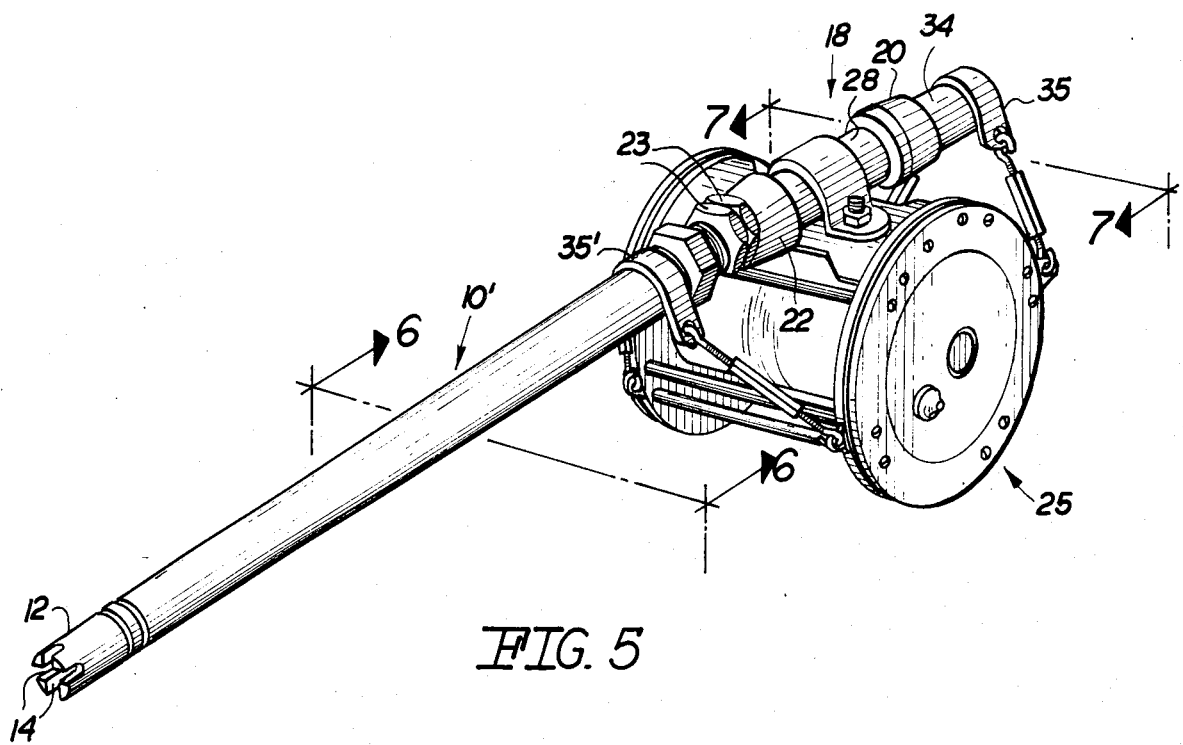
FIG. 5 is a perspective view of a linearly configured butt structure secured to a reel seat tube having mounted thereon a fishing reel assembly.
Figure 6:
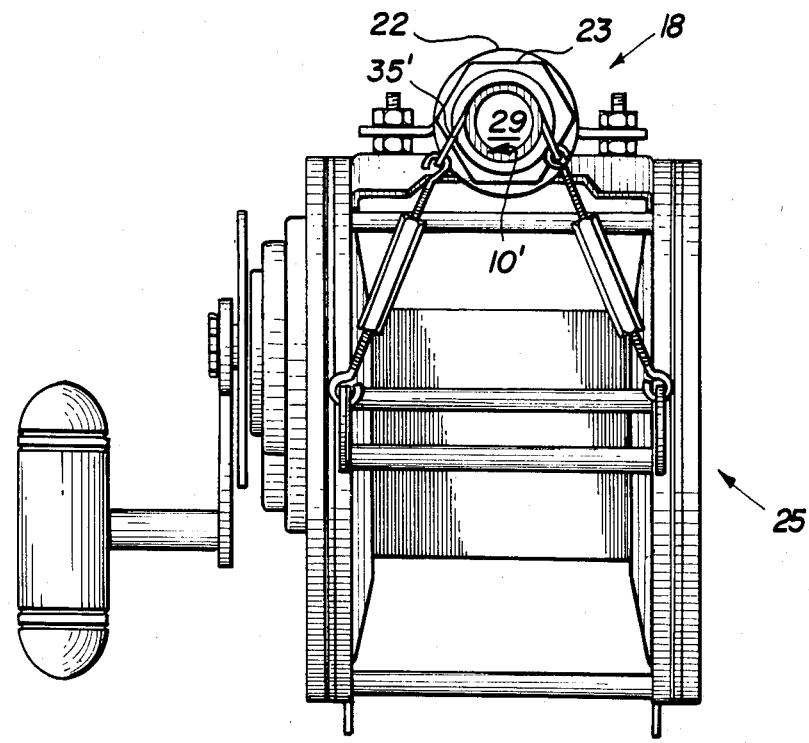
FIG. 6 is a sectional view along line 6—6 of FIG. 5.
Figure 7:
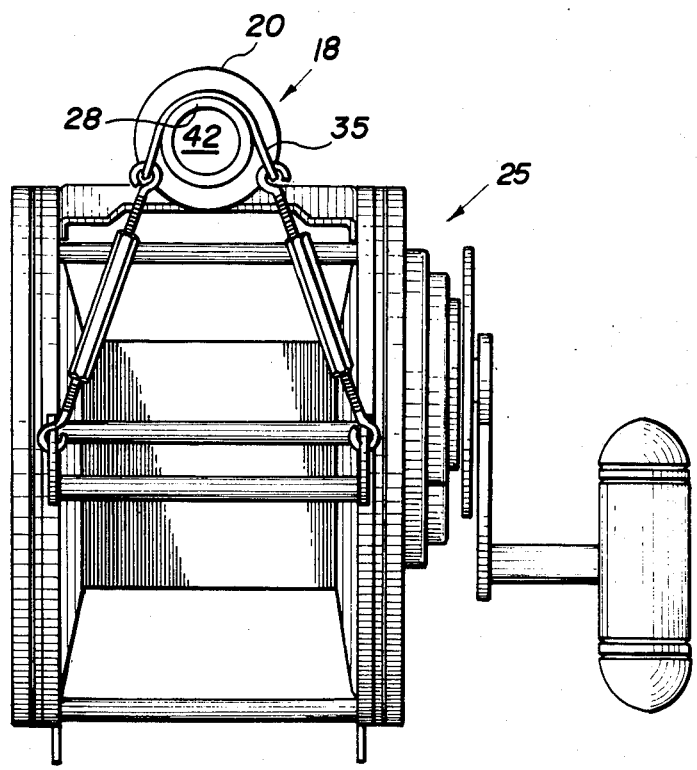
FIG. 7 is an end view along line 7—7 of FIG. 5.

As shown in FIGS. 1 through 5, the present invention is directed towards a butt structure generally indicated as 10 and 10' which includes a curved or angled elongated configuration as shown in FIG. 1 and a straight line configuration as shown in FIG. 5 respectively. The butt structure is of the type designed to support a fishing rod or rod blank (not shown for purposes of clarity) of the type used in deep sea fishing wherein the butt 10 or 10' is secured in a socket of a fighting chair or fighting belt, the latter being secured directly to the fisherman. In either of the embodiments of the butt 10 or 10', the distal extremity includes a gimble portion 12 having a slotted configuration as at 14 designed to facilitate placement and securement of the respective butt structures 10 and 10' into a socket on the aforementioned fighting chair or fighting belt.

An important feature of the present invention is the use of the respective butt 10 or 10' in combination with a reel seat means generally indicated as 18 structured to include a forward or leading hood 20 and a following, movably adjustable hood 22 (see FIG. 5). These hoods are cooperatively structured and positioned to removably support and/or secure the reel 25 to the reel seat means 18 in a conventional fashion.

More specifically, the reel seat means 18, shown in some detail in FIG. 3, is defined by a reel seat tube 28, best shown in FIG. 4, and having a substantially hollow interior portion along a major portion of its length as at 29 and further having opposite open ends 30 and 31 (FIG. 3). A portion of the length of the external surface of the reel seat tube 28 is threaded as at 32 for purposes of movably supporting the trailing hood structure 22 (see FIG. 4) and one or more locking members as at 23 (FIGS 4 and 5). The opposite end of the reel seat tube 28 relative to threaded surface 32, incorporates a space 34 contiguous to and extending rearwardly of the open end 31. The space 34 is specifically dimensioned and disposed to receive a brace 35 (see FIG. 5) secured to reel assembly 25. The brace 35 as well as an accompanying brace 35' are of a typical and conventional structure normally associated with certain heavy duty fishing reels such as the Penn International or Senator big game reel. Normally, the brace 35 engages the foregrip of the fishing rod or rod blank which is disposed on the interior of the reel seat tube 28. This engagement serves to stabilize the reel assembly 25 but also has a damaging affect on the foregrip or associated end of the fishing rod blank (not shown) when so engaged. Accordingly, an important feature of the present invention is a reel seat tube which includes a specific brace space 34 for the support and engagement of the brace 35 of the reel assembly 25.

The assembly of the present invention further comprises a mounting means generally indicated as 40 in the form of an elongated outwardly projecting mounting tube or shaft 38. The mounting means 40 including tube 38 accordingly includes a sufficient longitudinal dimension to be fixedly secured as at 41 within the bore 42 of the shank portion of the butt 10 (or butt 10') and extend outwardly from the proximal end thereof generally indicated as 44 (see FIG. 2). Further, the mounting means 40 has a sufficient longitudinal dimension to provide a support base on which the reel seat tube 28 is concentrically positioned, supported and mounted (see FIG. 3). Further, it is important to note that the reel seat tube 28, while concentrically positioned, is slidably removably from and rotatably positioned on the mounting tube 38 of mounting means 40.

With reference to FIG. 3, a stop means of the present invention is at least partially mounted both on the reel seat 28 and on the mounting means 40. The stop means includes an elongated pin or like stop element 46 positioned on the interior 29 of the reel seat tube 28 and extending diametrically across the tube 28. Similarly, the stop means includes at least one groove 50 integrally formed in and extending across the corresponding extremity generally indicated as 49 (see FIGS. 8A through 8C) of the tube 38 of mounting means 40. The groove 50 is specifically dimensioned and configured to engage and substantially surround the stop element 46 (see FIG. 3). Accordingly, relative rotation between the tube 38 of mounting means 40 and the reel seat tube 28 is restricted by the interengagement of the stop element 46 and at least one groove 50.

Figures 8A, 8B:
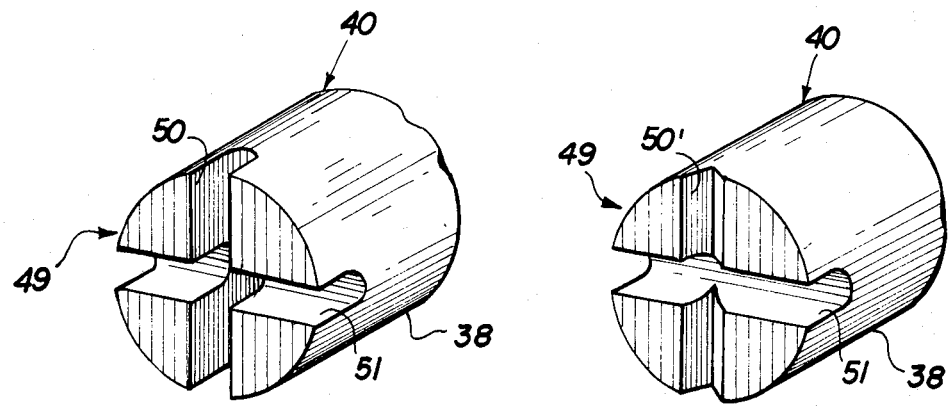
FIG. 8A is a perspective detailed view in partial cutaway of a stop receiving component of the stop structure of the present invention.
FIG. 8B is a different embodiment from FIG. 8A of a stop receiving portion of the stop structure of the present invention.

Another embodiment includes the stop means further comprising two grooves 50 and 51, preferably disposed in transverse relation to one another and in a preferred embodiment of FIG. 8A, the grooves 50 and 51 are disposed in perpendicular and intersecting relation to one another. Further, both the first groove 50 and the second groove 51 are both disposed and dimensioned to engage and at least partially surround the stop element 46 on the interior of reel seat tube 28. As shown in the embodiment of FIG. 8A, the grooves 50 and 51 both have a substantially U-shaped configuration. However, in the embodiment of FIG. 8B, groove 50' while positioned correspondingly to groove 50 in the embodiment of FIG. 8A has a somewhat V-shaped configuration. Similarly, with regard to the embodiment of FIG. 8C, both the grooves 50' and 51' have the V-shaped cross-sectional configuration. The difference between the U-shaped configuration of grooves 50, 51 and the V-shaped configuration of grooves 50', 51' is the difference in which the respective grooves grip and maintain such position. It should be noted that the U-shaped grooves 50 and 51 are somewhat "deeper" than the V-shaped grooves. Accordingly, the placement of the stop element 46 within the U-shaped grooves have the effect of substantially "locking" the stop element therein. Alternately, placement of the stop element 46 in the V-shaped grooves 50' or 51' serves to accomplish a fixed relation of the tube 38 of the mounting means 40 relative to the reel seat tube 28 but provides an easier dislocation.

Figure 8C:
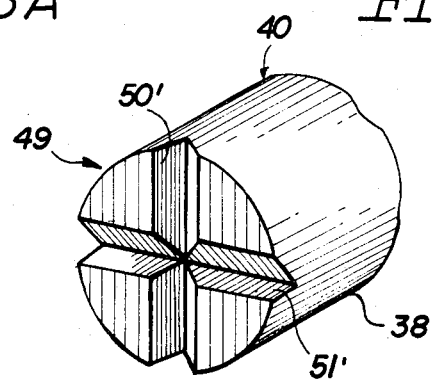
FIG. 8C is yet another embodiment of the stop receiving portion of the stop structure of the present invention.
Figure 9:
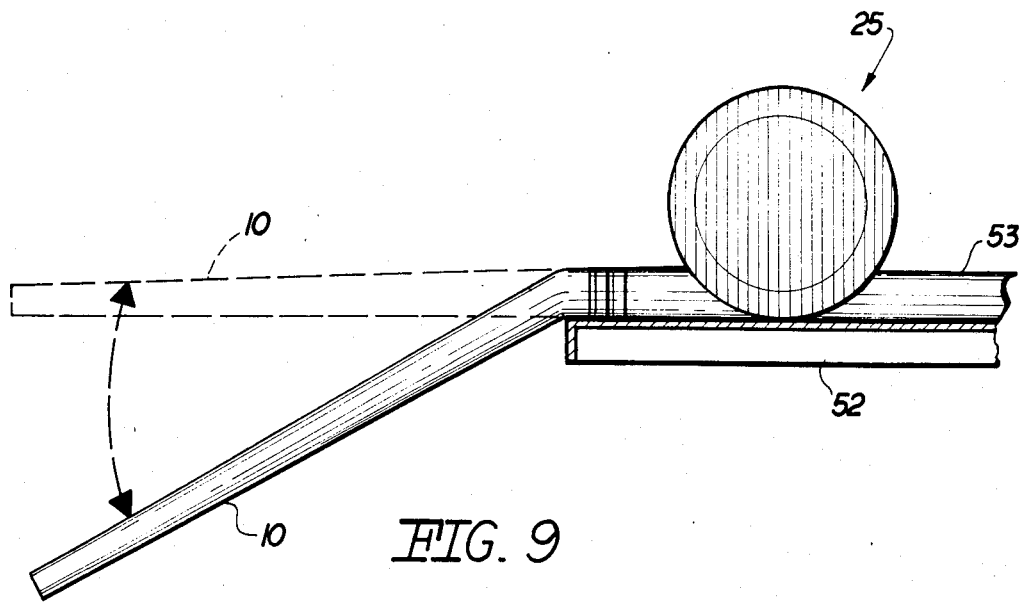
FIG. 9 is a side plan view in partial section and cutaway with a selected orientation of the butt structure relative to the reel seat tube and fishing rod represented in phantom lines.

With regard to FIG. 9, the advantage of the plurality of grooves 50 and 51 present in the tube 38 of extremity of the mounting means 40 is the preferred and selective orientation or placement of the butt 10. Support surface or object 52 represents a shelf or structure on which the fishing rod and reel assembly 53 and 25 respectively are stored while still connected to the butt 10. However, the angled configuration of butt 10 serves to normally position the butt in an inconvenient location such as when taking up head space in the close quarters of a boat or ship. Due to the existence of the cross-grooves as shown in FIGS. 8A through 8C, the butt 10 can be selectively positioned into the position shown in phantom lines in FIG. 9 by displacing the butt so that the stop element 46 is brought out of engagement with one of the first or second grooves 50 or 51 and brought into engagement with the other of the two grooves 50 or 51.

In operation, it should be emphasized that the fishing rod is fixedly secured, as by adhesive or any like applicable means, on the interior 29 of the reel seat 28 as shown in FIG. 3. This is accomplished by passing the blank fishing rod through the open end 31 and affixing it in such position. Accordingly, the reel assembly 25, reel seat tube 28 and fishing rod (not shown) are all fixedly secured to one another. Storage of the entire assembly therefore is accomplished without dismantling or cutting any of the rigging used on the reel assembly 25 and the fishing rod when in use. To the contrary, the entire assembly may be stored either with or without the butt 10 or 10' being secured thereto.

Other structural features of the present invention include the extremity as shown in FIG. 8A through 8C being a ferrule or cap structure which may be secured to the end portion of the mounting means associated with the stop means.

It is therefore to be understood that the following claims are intended to cover all of the generic and specific features of the invention herein described and all statements of the scope of the invention which as a matter of language, might be said to fall therebetween.

Now that the invention has been described,

What is claimed is:

1. A reel seat and butt structure assembly of the type designed to support and mount a deep sea fishing reel in operative relation to a fishing rod, said combination comprising:
    (a) a butt including an elongated shank portion and a hollow interior extending substantially along the length thereof,
    (b) a reel seat tube structured for removable supporting attachment to a reel assembly and having a hollow interior portion extending substantially along the length thereof, said reel seat tube having one open end disposed and dimensioned for receipt of the fishing rod therein and an opposite open end,
    (c) a mounting means fixedly secured to a proximal end of said shank portion for mounting of said reel seat tube on said butt,
    (d) said mounting means comprising an elongated confirguration and a transverse dimension sufficient to pass through an opposite open end of said reel seat tube and extend telescopically within said hollow interior portion,
    (e) said reel seat tube having an interior dimension and configuration sufficient to allow removable disposition thereof in surrounding, supported relation on said mounting means,
    (f) stop means for the prevention of relative rotation between said reel seat tube and said mounting means comprising a stop element fixedly mounted within said hollow interior of said reel seat tube and a stop receiving means formed on an outer extremity of said mounting means for engaging said stop element, said stop element and said stop receiving means disposable in mating engagement with one another when said mounting means is positioned within said reel seat tube, and
    (g) said reel seat the and butt being selectively removable from on another or attached during storage, and whereby said reel seat tube may remain connected to the fishing rod during storage.

2. An assembly as in claim 1 wherein said stop element comprises an elongated configuration and extends diametrically across said hollow interior of said reel seat tube in interruptive engagement with said stop receiving means, said stop element and said stop receiving means cooperatively disposed and structured to restrict rotational movement of said mounting means relative to said reel seat tube.

3. An assembly as in claim 2 wherein said stop receiving means comprises a ferrule structure secured to and defining an outer extremity of said mounting means and comprising at least a first elongated groove extending diametrically across said outer end, said groove dimensioned and configured to receive said stop member therein.

4. An assembly as in claim 3 wherein said groove has a sufficient longitudinal dimension to extend along and receive a major portion of the length of said stop member.

5. An assembly as in claim 3 wherein said first groove comprises a substantially U-shaped cross-sectional configuration extending along its length.

6. An assembly as in claim 3 wherein said first groove comprises a substantially V-shaped cross-sectional configuration extending along its length.

7. An assembly as in claim 3 further comprising said ferrule structure including a second elongated groove formed in intersecting transverse relation to said first groove and being structured and configured to receive said stop member therein when said stop member is not engaged by said first groove.

8. An assembly as in claim 7 wherein said second groove has a sufficient longitudinal dimension to extend along and receive a major portion of the length of said stop element.

9. An assembly as in claim 7 wherein both said first groove and said second groove comprise a substantially U-shaped cross-sectional configuration extending along their respective lengths.

10. An assembly as in claim 7 wherein both said first groove and said second groove comprise a substantially V-shaped cross-sectional configuration extending along their respective lengths.

11. An assembly as in claim 7 wherein one of said first and second grooves comprises a substantially U-shaped configuration extending along its length and the other of said first and second grooves comprising a substantially V-shaped configuration extending along its length.

12. An assembly as in claim 3 wherein said butt structure and secured mounting means is selectively rotatable at least 90 degrees when positioning said stop element out of engagement with one of said first or second grooves and into engagement with the other of said first or second grooves, whereby said butt structure may be selectively positionable in an out-of-the-way location when said assembly is stored.

* * * * *